(12) United States Patent     (10) Patent No.:   US 8,488,633 B2
Bahl et al.     (45) Date of Patent:   *Jul. 16, 2013

(54) DYNAMIC TIME-SPECTRUM BLOCK ALLOCATION FOR COGNITIVE RADIO NETWORKS

(75) Inventors: Paramvir Bahl, Bellevue, WA (US); Thomas Moscibroda, Redmond, WA (US); Gopala Sri Hari Narlanka, Bellevue, WA (US); Yunnan Wu, Redmond, WA (US); Yuan Yuan, Greenbelt, MD (US); Ranveer Chandra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

This patent is subject to a terminal disclaimer.

(21) Appl. No.: 12/906,837

(22) Filed: Oct. 18, 2010

(65) Prior Publication Data

US 2011/0032892 A1   Feb. 10, 2011

Related U.S. Application Data

(63) Continuation of application No. 12/061,577, filed on Apr. 2, 2008, now Pat. No. 7,876,786.

(60) Provisional application No. 60/917,887, filed on May 14, 2007.

(51) Int. Cl.
*H04J 4/00*     (2006.01)
(52) U.S. Cl.
USPC ........... 370/478; 370/344; 370/348; 370/443; 370/447
(58) Field of Classification Search
USPC .......................................... 370/478
See application file for complete search history.

(56) References Cited

U.S. PATENT DOCUMENTS 6,385,434 B1   5/2002   Chuprun et al.
6,553,060 B2   4/2003   Souissi et al.
(Continued)

FOREIGN PATENT DOCUMENTS

EP     1750466 A1    2/2007
WO   WO9821834 A2   5/1998
(Continued)

OTHER PUBLICATIONS

Nissen, et al., "A Technology Enabled Framework for Dynamic Allocation of the Radio Frequency Spectrum", available at least as early as May 22, 2007, at <<http://www.mitre.org/work/tech_papers/tech_papers_04/04_1182/04_1182.pdf>>, pp. 10.

(Continued)

*Primary Examiner* — Yemane Mesfin
*Assistant Examiner* — Wanda Z Russell
(74) *Attorney, Agent, or Firm* — Lee & Hayes, PLLC

(57) ABSTRACT

Dynamic time-spectrum block allocation for cognitive radio networks is described. In one implementation, without need for a central controller, peer wireless nodes collaboratively sense local utilization of a communication spectrum and collaboratively share white spaces for communication links between the nodes. Sharing local views of the spectrum utilization with each other allows the nodes to dynamically allocate non-overlapping time-frequency blocks to the communication links between the nodes for efficiently utilizing the white spaces. The blocks are sized to optimally pack the available white spaces. The nodes regularly readjust the bandwidth and other parameters of all reserved blocks in response to demand, so that packing of the blocks in available white spaces maintains a fair distribution of the overall bandwidth of the white spaces among active communication links, minimizes finishing time of all communications, reduces contention overhead among the nodes contending for the white spaces, and maintains non-overlapping blocks.

20 Claims, 9 Drawing Sheets

U.S. PATENT DOCUMENTS

| | | | |
|---|---|---|---|
| 6,735,633 B1 * | 5/2004 | Welch et al. ............... 709/233 | |
| 6,882,851 B2 | 4/2005 | Sugar et al. | |
| 7,035,220 B1 | 4/2006 | Simcoe | |
| 7,843,819 B1 | 11/2010 | Benveniste | |
| 2002/0155839 A1 | 10/2002 | Nisbet | |
| 2003/0210680 A1 * | 11/2003 | Rao et al. ............... 370/352 | |
| 2004/0095884 A1 | 5/2004 | Lee et al. | |
| 2004/0137915 A1 | 7/2004 | Diener et al. | |
| 2004/0264548 A1 | 12/2004 | Miyoshi | |
| 2005/0289256 A1 | 12/2005 | Cudak et al. | |
| 2006/0009209 A1 | 1/2006 | Rieser et al. | |
| 2006/0067354 A1 | 3/2006 | Waltho et al. | |
| 2006/0133272 A1 | 6/2006 | Yuan et al. | |
| 2006/0268764 A1 | 11/2006 | Harris | |
| 2007/0091824 A1 | 4/2007 | Budampati et al. | |
| 2007/0091998 A1 | 4/2007 | Woo et al. | |
| 2007/0100922 A1 | 5/2007 | Ashish | |
| 2007/0104140 A1 | 5/2007 | Ashish et al. | |
| 2008/0080553 A1 | 4/2008 | Hasty et al. | |
| 2008/0112427 A1 | 5/2008 | Seidel et al. | |
| 2010/0046483 A1 | 2/2010 | Nandagopalan | |

FOREIGN PATENT DOCUMENTS

| | | | |
|---|---|---|---|
| WO | WO2004114598 A1 | 12/2004 | |
| WO | WO2006120600 A1 | 11/2006 | |
| WO | WO2007052995 A1 | 5/2007 | |

OTHER PUBLICATIONS

Raychaudhuri, et al., "CogNet—An Architecture for Experimental Cognitive Radio Networks within the Future Internet", available at least as early as May 22, 2007, at <<http://www.ittc.ku.edu/cognet/docs/CogNet_MobiArch_2006_060807b.pdf>>, pp. 6.

Werbach, "Radio Revolution: The Coming Age of Unlicensed Wireless", available at least as early as May 22, 2007, at <<http://werbach.com/docs/RadioRevolution.pdf>>, New America Foundation, pp. 55.

Yuan, et al., "KNOWS: Kognitiv Networking Over White Spaces", available at least as realy May 22, 2007, at <<http://research.microsoft.com/~ranveer/docs/cognitive-dyspan.pdf>>, pp. 12.

Final Office Action for U.S. Appl. No. 11/847,034, mailed on May 24, 2011, Paramvir Bahl, New Media Access Control (MAC) Protocol for Cognitive Wireless Networks.

Bharghavan et al., "MACAW: A Media Access Protocol for Wireless LAN's", ACM SIGCOMM Computer Commincation Review, vol. 24, No. 4, Oct. 1994, pp. #212-pp. #225.

Final Office Action for U.S. Appl. No. 11/847,034, mailed on Jan. 4, 2013, Paramvir Bahl et al., New Media Access Control (MAC) Protocol for Cognitive Wireless Networks, 14 pages.

Non-Final Office Action for U.S. Appl. No. 11/847,034, mailed on Apr. 27, 2012, Paramvir Bahl et al., "New Media Access Control (MAC) Protocol for Cognitive Wireless Networks ", 17 pages.

* cited by examiner

_US 8,488,633 B2_

DYNAMIC TIME-SPECTRUM BLOCK ALLOCATION FOR COGNITIVE RADIO NETWORKS

RELATED APPLICATIONS

This application is a continuation of and claims priority to U.S. patent application Ser. No. 12/061,577, filed on Apr. 2, 2008 the disclosure of which is incorporated by reference herein, which claims priority to U.S. Provisional Patent Application No. 60/917,887 to Bahl et al., entitled, "Dynamic Time-Spectrum Block Allocation For Cognitive Radio Networks," filed May 14, 2007, and incorporated herein by reference; and claims priority to U.S. patent application Ser. No. 11/847,034 to Bahl et al., entitled, "New Media Access Control (MAC) Protocol For Cognitive Wireless Networks," filed Aug. 19, 2007, and incorporated herein by reference, which in turn claims priority to U.S. Provisional Patent Application No. 60/868,254 to Bahl et al., entitled, "New Media Access Control (MAC) Protocol For Cognitive Wireless Networks," filed Dec. 1, 2006, and incorporated herein by reference.

BACKGROUND

There has been a significant increase in the use of Wi-Fi and Bluetooth devices, and this trend is likely to continue with adoption of WiMax and city-wide mesh networks. As the possibility of overcrowding the Industrial-Scientific-Medical (ISM) bands of the radio frequency (RF) spectrum—such as the 2.4 GHz band—increases with a growing number of wireless devices, cognitive radios try to alleviate utilization pressure on affected bands. A cognitive radio constantly senses the spectrum and opportunistically utilizes unused frequencies in target portions of the spectrum. For example, some portions of the spectrum are underutilized, i.e., only about 5% of the spectrum from 30 MHz to 30 GHz is used at any one time in the U.S. Additionally, television bands from 470 MHz to 698 MHz might be opened up to unlicensed users in 2009.

A key challenge in the design of cognitive radio networks has been efficient and non-interfering spectrum allocation, which enables nodes to reserve chunks of the spectrum for certain periods of time. The problem of allocating spectrum for cognitive radio networks poses new challenges that have not arisen in traditional wireless technologies, including Wi-Fi. In particular, cognitive radios provide the capability of dynamically adjusting both the center frequency and the communication bandwidth for each transmission. In contrast, traditional wireless networks use a fixed channel bandwidth. For example, each channel in IEEE 802.11a is defined by the standard to be 20 MHz wide. Consequently, the lack of predefined channels prevents the use of conventional multi-channel Media Access Control (MAC) protocols for spectrum allocation in cognitive radio networks.

Extensively studied classical channel assignment and scheduling problems are also not directly applicable to the issue of spectrum allocation in cognitive radio networks. Spectrum allocation for channels of predefined bandwidth has been conventionally modeled, but modeling variable bandwidth communication is much more complicated.

SUMMARY

Dynamic time-spectrum block allocation for cognitive radio networks is described. In one implementation, without need for a central controller, wireless nodes collaboratively sense local utilization of a communication spectrum and collaboratively share white spaces for communication links between the nodes. Sharing local views of the spectrum utilization with each other allows the nodes to dynamically allocate non-overlapping time-frequency blocks to the communication links between the nodes for efficiently utilizing the white spaces. The blocks are sized to optimally pack the available white spaces. The nodes regularly readjust the bandwidth and other parameters of all reserved blocks in response to demand, so that the packing of the blocks in available white spaces maintains a fair distribution of the overall available spectrum among active communication links, minimizes finishing time of all communications, reduces contention overhead among the nodes contending for the white spaces, and maintains non-overlapping blocks.

This summary is provided to introduce the subject matter of dynamic time-spectrum block allocation for cognitive networks, which is further described below in the Detailed Description. This summary is not intended to identify essential features of the claimed subject matter, nor is it intended for use in determining the scope of the claimed subject matter.

DESCRIPTION

Overview

Figure 1:
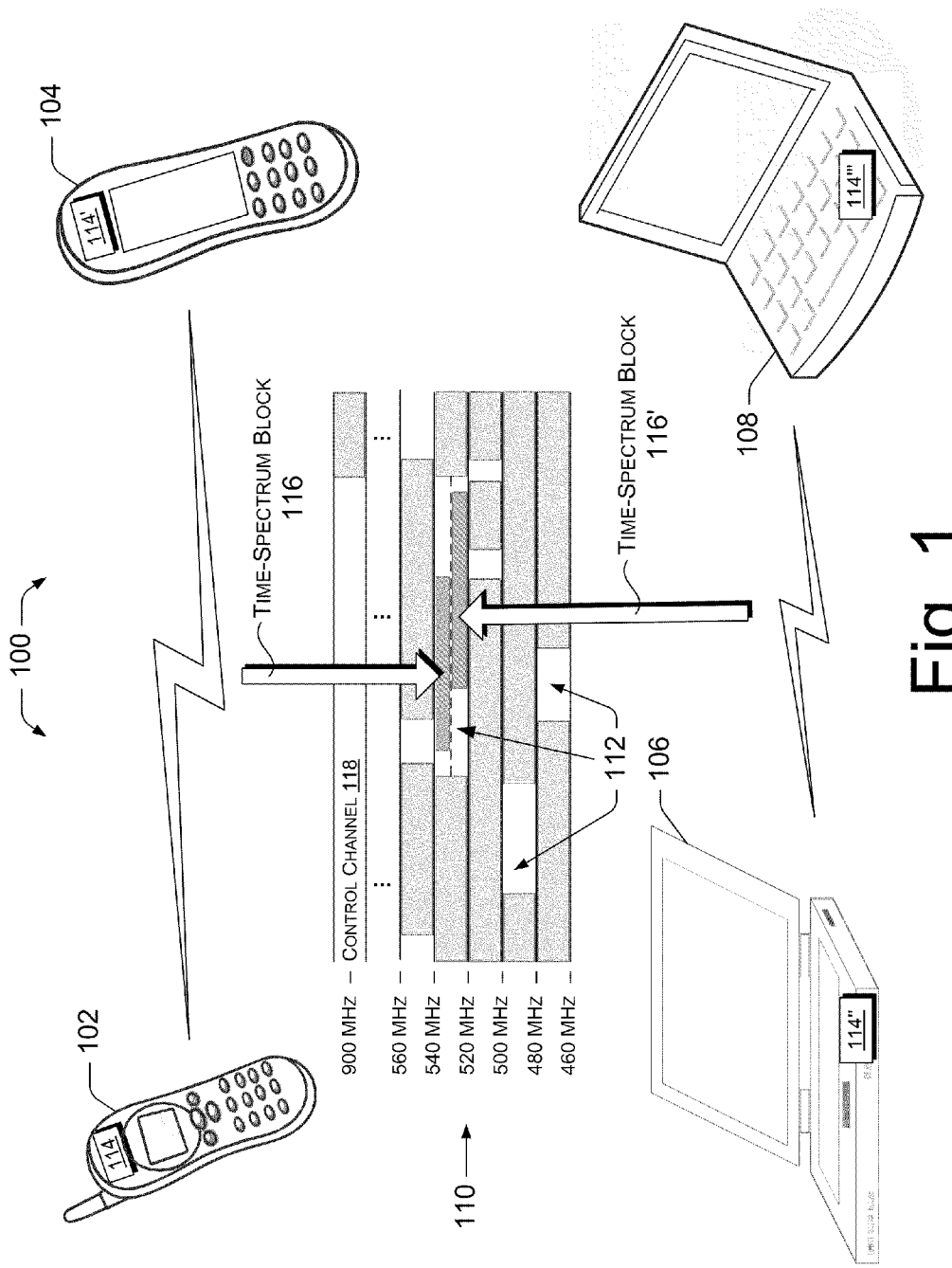
FIG. 1 is a diagram of an exemplary system of nodes collaboratively allocating time-spectrum blocks.

This disclosure describes protocols for optimizing spectrum allocation in "white spaces," the unused chunks of the radio frequency (RF) spectrum that occur haphazardly between spectrum chunks occupied by primary users and planned broadcasts. White spaces are fragmented and of different sizes. The availability of white spaces is temporal and depends on the geographic location of a radio.

To address the optimal utilization of randomly occurring white spaces, the systems and methods described herein adopt the concept of flexible time-spectrum blocks to model spectrum reservation, each block representing the time over which a cognitive radio uses a portion of the spectrum. An exemplary system dynamically and adaptively packs variously sized time-spectrum blocks in a two-dimensional time-frequency space, optimized such that the demands of all nodes in a locality are satisfied as best as possible. This optimal spectrum packing ensures high throughput and fairness across various scenarios while overall spectrum utilization is also maximized. Both centralized and distributed spectrum allocation processes that optimize spectrum utilization will be described.

The exemplary spectrum allocation processes described herein can be applied to RF communication within the commonly designated communication bands, such as ELF 3-30 Hz, SLF 30-300 Hz, ULF 300 Hz-3 kHz, VLF 3 kHz-30 kHz, LF 30 kHz-300 kHz, MF 300 kHz-3 MHz, HF 3 MHz-30 MHz, VHF 30 MHz-300 MHz, UHF 300 MHz-3 GHz, SHF 3 GHz-30 GHz, EHF 30 GHz-300 GHz. For ease of description, however, illustrative examples may be framed within the spectrum range of approximately 30 MHz-30 GHz or approximately within television bands, such as VHF and UHF.

This description also models an exemplary theoretical framework for dynamic spectrum allocation in whitespace cognitive radio networks. The exemplary theoretical framework captures essential features for cognitive radios, such as frequency agility and adaptive bandwidth and introduces the exemplary time-spectrum block, which represents the time for which a cognitive radio uses a portion of the spectrum. Bandwidth, as used herein, means the width of the spectrum over which the radio transmits (and receives) its signals; specified in MHz. As introduced above, the concept of time-spectrum blocks defines the spectrum allocation problem as the packing of time-spectrum blocks of variable size in a two dimensional time-frequency space, such that the demands of all nodes are as fully satisfied as possible. This exemplary model profoundly changes the conventional analysis framework of using variants of a graph-coloring problem for maximizing spectrum utilization.

An exemplary distributed spectrum allocation process, referred to herein as "b-SMART" (roughly an acronym for "distributed spectrum allocation over white spaces") provides the first practical, distributed protocol to solve the spectrum allocation problem in real cognitive radio networks. b-SMART enables each node to dynamically decide on a time-spectrum block based on local information only. b-SMART achieves a high throughput and fairness as predicted by intensive analysis and as shown by extensive simulations under various conditions and scenarios in QUALNET.

Exemplary System—Under a New CMAC

The exemplary dynamic spectrum allocation processes can be implemented as part of an exemplary cognitive radio hardware platform. The exemplary cognitive hardware platform, in turn, utilizes an exemplary CMAC protocol as described in the above-cited U.S. patent application Ser. No. 11/847,034 to Bahl et al., entitled, "New Media Access Control (MAC) Protocol For Cognitive Wireless Networks," filed Aug. 19, 2007, and incorporated herein by reference.

As shown in FIG. 1, in one implementation of an exemplary cognitive wireless networking system 100, network nodes 102 (e.g., cell phones, computers 102, 104, 106, 108) in wireless networks negotiate adaptive radio-spectrum allocation such that the nodes self-organize into an efficient network without coordination from a central controller. Depending on the particular network to participate under the exemplary CMAC protocol, the nodes may be cell phones, mobile computing devices with wireless cards, etc., or a mix thereof. Each node has wireless cognitive radio capability, as will be described below. On a practical level, the exemplary CMAC protocol provides for a self-organized network, with very low deployment overhead. Users turn on communications devices, and the devices switch to a control channel and find the open spectrum spaces 112 (white spaces within a designated frequency range portion of the RF spectrum) on which to communicate. Such an exemplary CMAC protocol can provide up to 200% throughput improvement over conventional systems that use an IEEE 802.11-based MAC protocol.

Nodes functioning under the exemplary CMAC protocol scan a relatively wide range of frequencies of a medium 110, such as a radio broadcast spectrum, to find temporarily unused segments 112 of communication bandwidth. For example, the nodes 102 may search for a channel that is idle or that will be idle. Two nodes communicate with each other by negotiating parameters, such as the center frequency, bandwidth, and timing of a data packet exchange to occur in the near future. The nodes thus exploit empty spectrum space 112 to maximize overall spectrum utilization. (Empty spectrum space 112 is depicted as white in FIG. 1 while occupied bands are depicted as grey.) In one implementation, the nodes 102 efficiently exploit unused resources of a TV spectrum.

Each node 102 contains an instance of an exemplary cognitive wireless networking engine 114. Each cognitive wireless networking engine 114, in turn, maintains its own Resource Allocation Matrix compatible with the CMAC protocol. The Resource Allocation Matrix can be thought of as a "channel guide" of sorts that shows when each frequency is available or in use by another node in the first node's vicinity; or by a licensed broadcaster that is not necessarily participating in the CMAC network. These previously scheduled users are referred to herein as ("incumbents"). Each node 102 in a radio range locality keeps its own version of the Resource Allocation Matrix, for example, as an onboard bitmap, which it updates when it reserves a segment of the spectrum or when it "hears" (i.e., receives a packet containing spectrum reservation information) its neighbor nodes communicating with each other and reserving segments of the spectrum.

As reservations for a part of the spectrum are made on a common control channel, nodes can overhear their neighbor's reservations and can maintain an up-to-date Resource Allocation Matrix. The Resource Allocation Matrix allows each node to determine locally which parts of its spectrum are free and to negotiate and reserve a time-spectrum block 116 for communication. When making a new reservation, a node checks that the reservation does not overlap (collide) with an ongoing or existing reservation. This way, interference and collisions are prevented.

Moreover, exemplary spectrum allocation processes, to be described below, optimize the allocation of the time-spectrum blocks 116 being reserved by multiple local nodes. That is, the exemplary spectrum allocation processes optimize the packing of time-spectrum blocks 116 in the white spaces 112.

The exemplary CMAC protocol incorporates "virtual sensing" to arbitrate access to a fragmented spectrum. Specifically, CMAC extends the RTS (request-to-send)/CTS (clear-to-send) mechanism of IEEE 802.11, which reserves airtime on a channel, in order to reserve the empty chunks of the spectrum. Further, the spectrum allocation schema provides a mechanism that enables networked devices to maintain an up-to-date Resource Allocation Matrix illuminating spectrum usage in their local neighborhood.

The CMAC adaptive spectrum allocation is different from the conventional methods of spectrum allocation, which divide the available spectrum into fixed channels of equal bandwidth. For example, in IEEE 802.11a, there are 13 orthogonal channels of 20 MHz bandwidth. This conventional fixed channelization structure is simple and incurs low implementation cost. However, such a structure creates hard boundaries for utilizing the entire spectrum. One implication is that it prevents users from bundling vacant channels to obtain higher throughput. Moreover, in the case of the TV spectrum, the spectrum can be fragmented by the incumbent signals, leaving various sizes of spectrum segments (i.e., spectrum bands of various different widths) available for sharing. The exemplary adaptive spectrum allocation adopted by the exemplary cognitive wireless networking system 100 deviates and improves upon this conventional channel concept. Under CMAC, the operating frequency and the bandwidth are adaptively determined based on local information.

In one implementation, an exemplary cognitive wireless networking system 100 uses a narrow-band control channel 118. The control channel 118 is used to arbitrate the use of the available spectrum between all contending nodes. Nodes use the control channel 118 to make spectrum allocation reservations. As mentioned, nodes overhear the reservations made by neighboring nodes and update their Resource Allocation Matrix accordingly. This way, they can maintain a consistent view of the current and future spectrum allocation in their neighborhood. In contrast to systems that use a central spectrum controller with global knowledge of user activities and spectrum allocations, the exemplary cognitive wireless networking system 100 uses a distributed approach for efficient spectrum sharing. Each node 102 constantly listens on the control channel 118 to keep track of spectrum availability in real time. In one implementation, the bandwidth of the control channel 118 is set to 5 MHz, e.g., for a control channel 118 that is in the unlicensed ISM spectrum (902-928 MHz).

Using one fixed control channel 118 raises security concerns. The nodes 102 in the exemplary cognitive wireless networking system 100 cannot operate in the TV spectrum if the control channel 118 is occupied or jammed. In general, the control channel 118 used in the CMAC protocol can be a logical channel and is not restricted to a single, fixed physical spectrum band. In one implementation, a common hopping sequence to build the control channel 118 adds robustness. The control channel 118 can hop across vacant channels according to a negotiated sequence at a coarse-time level (in one implementation, several seconds). In addition, the control channel 118 is typically different from the frequency band used for data communications. Different bands may have different propagation properties, for instance in terms of the transmission range. In one implementation, the effective range of the control channel 118 signals is less than the range of the data communication modality, to avoid scheduling the transmission of data packets that cannot actually be transmitted on the selected spectrum band for transmission because effective transmission range on this band is less than on the control channel.

The exemplary cognitive wireless networking system 100 enables opportunistic access and sharing of white spaces by adaptively allocating the spectrum among contending users. The exemplary cognitive wireless networking system 100 can employ the exemplary distributed spectrum allocation process to dynamically select the operating frequency, the occupancy time, and communication bandwidth for data transmissions, based on the instantaneously available white spaces, the contention intensity, and the user demand. If there are few users in the system, the exemplary cognitive wireless networking system 100 provides each user with a larger chunk of the total available, free spectrum. It adaptively provides smaller chunks to all users if there are more contending nodes or if more parts of the spectrum are currently used by incumbent users, as will be described in greater detail below.

In one implementation, a node 102 possesses a scanning radio (or simply "scanner") and a reconfigurable radio. The scanner periodically searches for white spaces in the TV spectrum, and the reconfigurable radio tunes to the white space and performs data communications. When not scanning, the scanning radio functions as a receiver listening for control packets on the control channel 118. This synergistic design of the radio platform and the CMAC protocol enables the exemplary cognitive wireless networking system 100 to provide collaborative detection of white spaces and adaptive spectrum allocation among contending users.

An exemplary spectrum allocation engine (204), to be described in greater detail below, enables users to adaptively adjust the time, frequency, and bandwidth of data transmissions in a fine time-scale. Dynamically adjusting the bandwidth of the channel for data transmission is in contrast to the widely-adopted spectrum allocation schemes used in IEEE 802.11 and IEEE 802.16, which divide the spectrum into static channels of fixed, pre-determined channel-width (bandwidth).

One goal of the exemplary CMAC-based cognitive wireless networking system 100 is to enable wireless nodes 102 to self-organize into a network with or without coordination from a central controller, which poses several challenges, including the following:

Robust white space detection. Unlicensed users need a robust way to discover the available white spaces. Different bandwidth chunks can be available at the sender and the receiver, therefore the goal is to use a spectrum chunk that is free for both of them.

Parallelism and connectivity. There is a tradeoff between parallelism of flows and connectivity in the network. To enable parallelism, different flows should be active in different chunks of the spectrum. However, this might prevent two nodes 102 (users) that are part of the same network from communicating with each other. One approach to solve this problem is to use schemes that have been proposed by multi-channel media access protocols. However, these approaches incur extra overhead.

Adaptive bandwidth selection. The amount of bandwidth assigned to a pair of communicating nodes 102 should depend on the total available spectrum, the contention intensity, and user traffic demand. Intuitively, when there are few users, each user should be assigned a wide bandwidth, which enables transmissions at a higher data rate; when there are more users within mutual communication range, the total spectrum should be divided into smaller chunks to accommodate more concurrent transmissions.

The exemplary cognitive wireless networking system 100 addresses the above challenges as follows. First, the exemplary cognitive wireless networking system 100 uses a collaborative scanning method to detect incumbent operators in the media, for example, in a given broadcast band. Therefore, only those portions of the spectrum that are detected to be available (i.e., not currently in use by an incumbent user) at the participating users are used for data communication. To address the second challenge, the exemplary cognitive wireless networking system 100 uses the common signaling channel 118 (e.g., in the ISM band) to avoid collisions and to maintain connectivity among nodes, even when they are transmitting or receiving on a different spectrum chunk. Parallelism is ensured by simultaneous data communication on the reconfigurable radio. The exemplary cognitive wireless networking system 100 addresses the final challenge by allowing nodes to opportunistically use available spectrum resources by reserving chunks of bandwidth at a fine time-scale. The width of an allocated chunk, as mentioned, depends on the amount of available spectrum and the number of contending nodes.

Exemplary Engines

Figure 2:
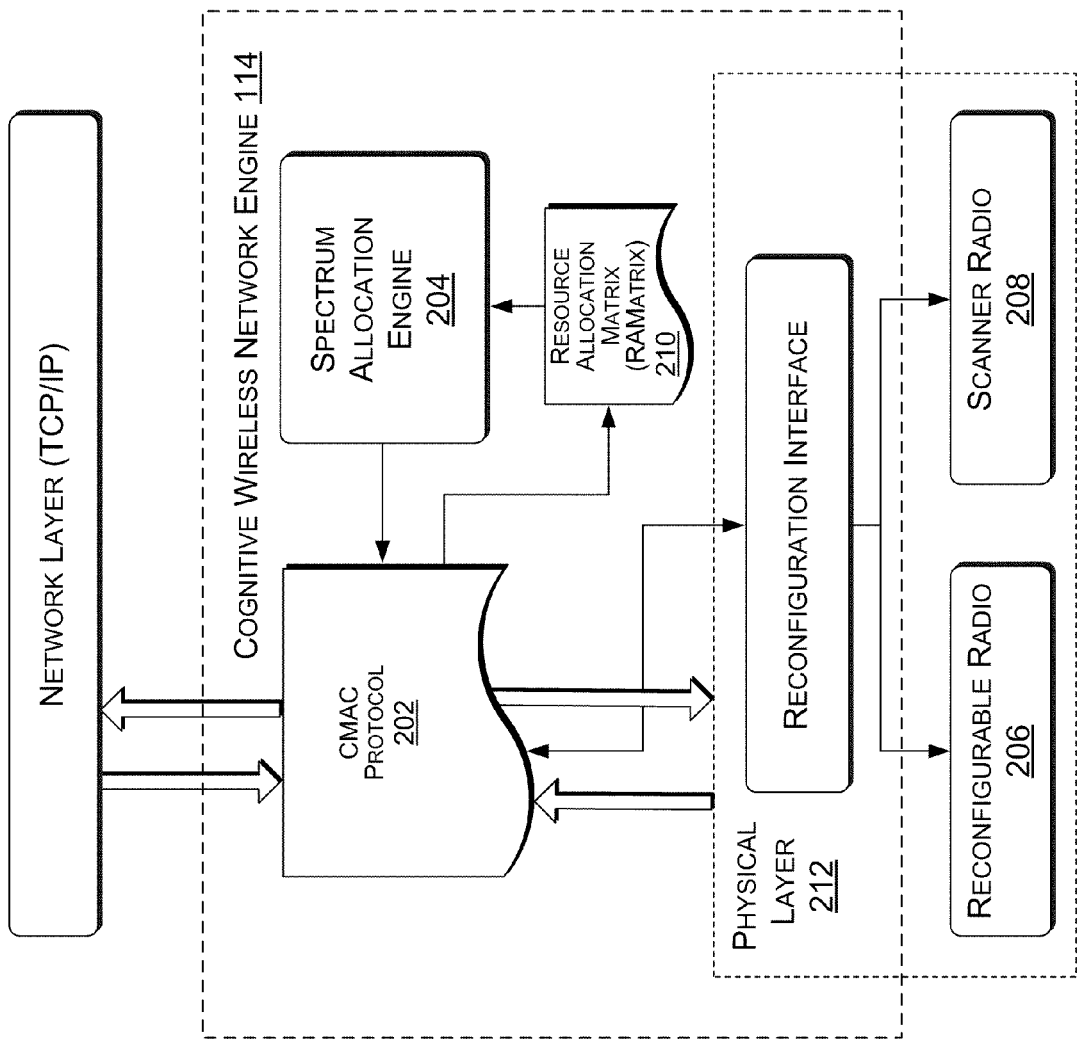
FIG. 2 is a block diagram of an exemplary cognitive wireless networking engine that includes an exemplary spectrum allocation engine.

FIG. 2 shows an overview of the exemplary cognitive wireless networking engine 114 shown in FIG. 1. The illustrated implementation is only one example configuration, for descriptive purposes. Many other arrangements of the components of an exemplary cognitive wireless networking engine 114 are possible within the scope of the subject matter. Implementations of the cognitive wireless networking engine 114 can be executed in combinations of hardware and software.

The illustrated cognitive wireless networking engine 114 includes various hardware, which can function in accordance with the exemplary CMAC protocol 202, and the exemplary spectrum allocation engine 204, which can allocate time-spectrum blocks to white spaces according to either the exemplary centralized or the exemplary distributed spectrum allocation process to be detailed further below. The hardware platform can include a dual-mode scanner 208 and a reconfigurable radio 206. In one implementation, the scanner radio 208 alternates between functioning as a scanner and a receiver. For example, it can scan a broadcast spectrum such as the TV bands at least once every 30 minutes, as required by the FCC. The scanner radio 208 in one implementation takes less than 10 milliseconds to scan one 6 MHz TV channel. For most of the time, the scanner radio 208 can work as a receiver and in one implementation is tuned to the 902-928 MHz unlicensed ISM band, which in one implementation is used as a control channel 118.

To enable efficient spectrum sharing, each node 102 stores the spectrum usage information of the near future in its local vicinity in a local data structure, e.g., the Resource Allocation Matrix 210. The spectrum allocation engine 204 uses the information stored in the Resource Allocation Matrix 210 to determine when, for how long, and in which portion of the unused spectrum the node 102 should reserve its next data transmission. The Resource Allocation Matrix 210 is used by the spectrum allocation engine 204 to adaptively assign time-spectrum blocks 116 to each node 106 in the network. The CMAC protocol 202 conveys the reservation to the neighbors of the sender 106 and the receiver 108

Figure 3:
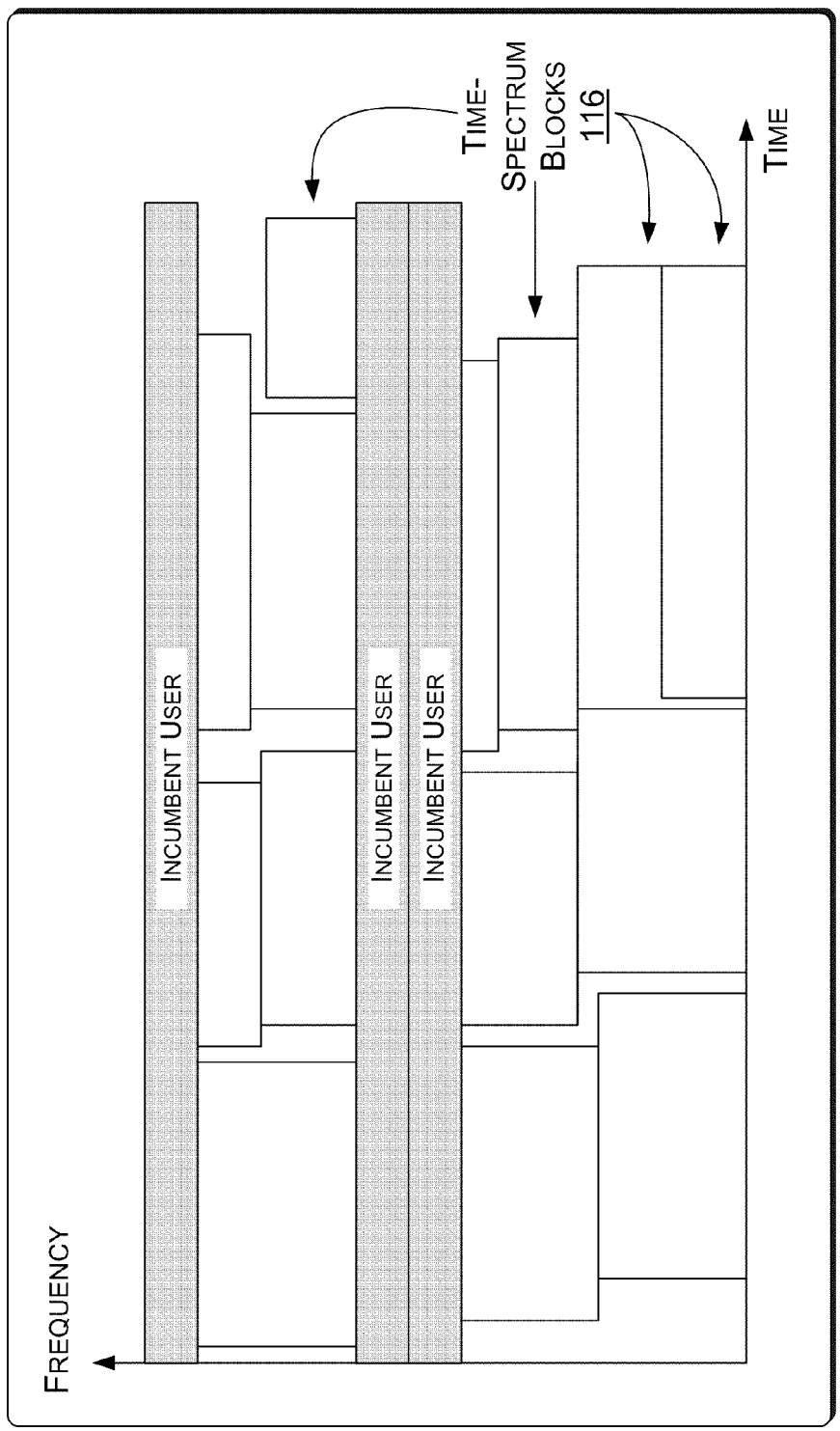
FIG. 3 is a diagram of exemplary time-spectrum block allocations.
Figure 4:
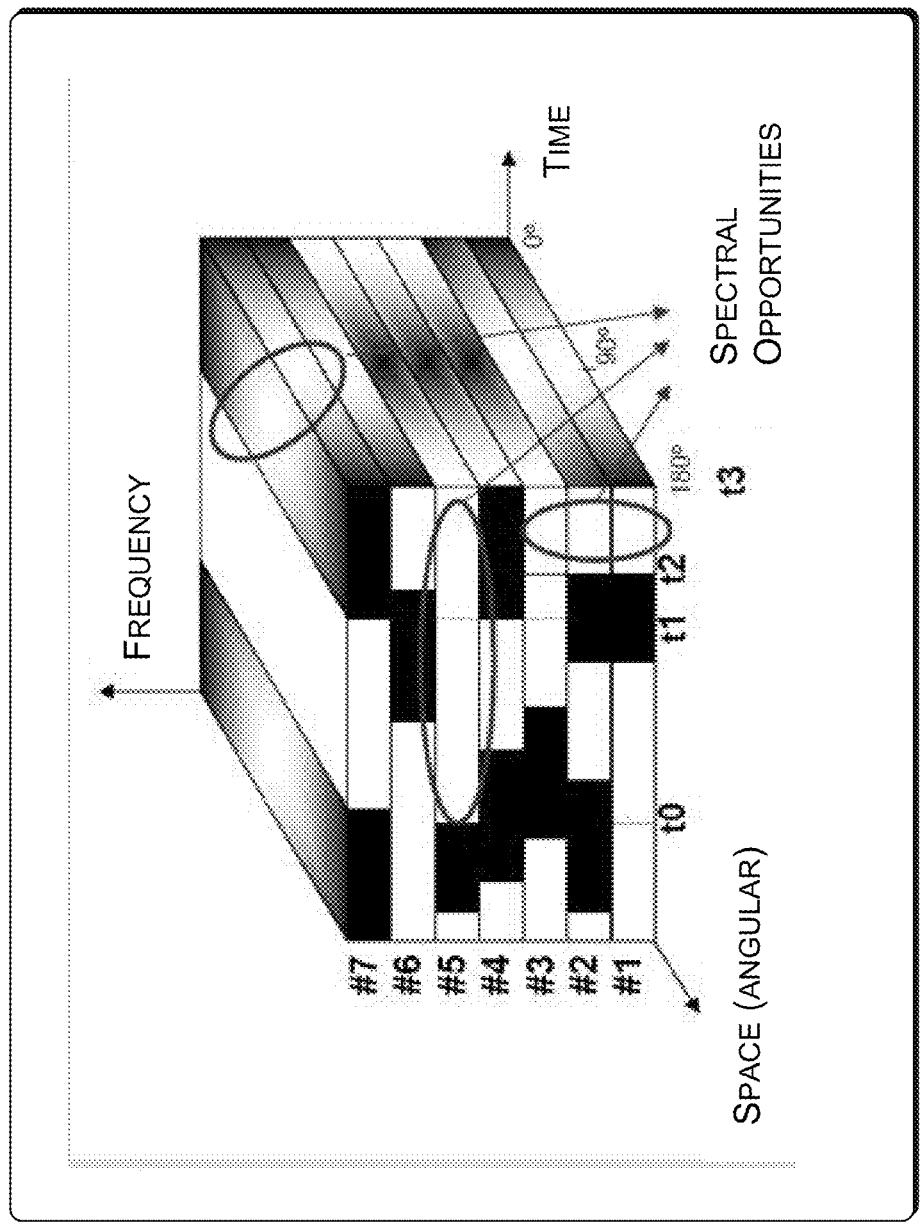
FIG. 4 is a diagram of spectral opportunities in a communication spectrum.

The Resource Allocation Matrix 210 records spectrum usage of neighboring unlicensed users in units of time-spectrum blocks 116. A time-spectrum block 116 can be defined as the time duration and the portion of spectrum that is reserved by a node 102 for its communication. FIG. 3 depicts one snapshot of time-spectrum block allocations stored in a Resource Allocation Matrix 210. The bandwidth and time duration of each time-spectrum block 116 is tuned according to the perceived contention intensity, the total available resources, and can also depend on the queue length or traffic demand of neighboring nodes. The reconfigurable radio 206 is then configured to operate in the defined time-spectrum block 116. The reconfigurable radio 206 switches back to the control channel 118 after the time-spectrum block 116 is consumed. The dynamic spectrum allocation problem can also be viewed as dynamic packing of time-spectrum blocks into a three-dimensional resource, consisting of time, frequency, and space as shown in FIG. 4 which will be described in greater detail below.

Returning to FIG. 2, in the physical layer 212, the scanner/receiver 208 in conjunction with the CMAC protocol 202 builds the Resource Allocation Matrix 210 and the spectrum allocation engine 204 implements a reservation-based mechanism that regulates spectrum access. Two communicating nodes 102 first contend for spectrum access on the control channel 118. Upon winning contention, a handshake is performed, which enables the spectrum allocation engine 204 at the sender and the receiver to collaboratively agree on a time-spectrum block. The reservation is announced on the control channel 118 to inform neighboring nodes of node 102. Accordingly, the sender, receiver, and all neighboring nodes populate their Resource Allocation Matrix 210 with the new reservation, and nodes delete expired time-spectrum block allocations from their Resource Allocation Matrix.

In one implementation, the reconfigurable radio 206 has a set of operational parameters that can be adjusted with low time overhead. The current implementation of the reconfigurable radio 206 uses a commodity IEEE 802.11g card to generate OFDM signals at 2.4 GHz. A wide-band frequency synthesizer is used to convert the received signals to the specified frequency. To control the reconfigurable radio 206, the interface to the MAC layer is a list of register values that specifies the operating frequency, bandwidth, transmission power level, and other wireless communication parameters. In one implementation, the operating frequency can be set from 512 to 698 MHz in 0.5 MHz steps, and the selectable bandwidth options are 5, 10, 20, and 40 MHz. The narrow bandwidth options, such as 5 MHz, are provided to use white space spectrum in between the incumbent operators (fragmented spectrum). The maximum output power is 200 mW and the power level is controllable from −8 to +23 dBm. The threshold for packet reception, e.g., in a TV band, is −85 dBm. The time overhead for adjusting the radio parameters, e.g. frequency, bandwidth, and power level, can be within 100 µs.

In one implementation, the scanner 208 periodically scans the spectrum 110 and locates the vacant pockets of spectrum 110 that are without incumbent signals. For most of the time, the scanner 208 works as a receiver operating on the control channel 118. The CMAC layer protocol can change the scanning schedule and set the frequency range to scan by configuring the registers in the scanner 208.

In one variation, a GPS receiver is incorporated in the hardware for loading location information and performing time synchronization. Based on the estimated location, the node 102 can identify unused spectrum in case a database with TV programming information is available. This is an alternative approach suggested by the FCC for detecting incumbent users. Therefore, the GPS receiver can extend the flexibility of the exemplary cognitive wireless networking system 100.

Enhanced Medium Access Control

In one implementation, a spectrum allocation engine 204 or method works as follows. Each node (e.g., 102, 104, 106, 108) that has pending packets contends for spectrum resources on the unlicensed control channel. The sender (e.g., 102) uses a three-way handshake with the destination node (e.g., 104), as provisioned by the exemplary CMAC, to decide on the time-spectrum block 116 to use for the transmission, and to reserve the block 116 in the neighborhood. Each neighboring node (e.g., 106, 108) equipped with an extra receiver 208 overhears the handshake process and stores this information in a local table (e.g., 210). When the time of the reserved time-spectrum block arrives, both the sender 102 and the receiver 104 configure their reconfigurable transceiver parameters to switch to the selected frequency band and exchange data packets in the time-spectrum block. Well-known techniques can be employed to synchronize the clocks of one-hop nodes within 1 µs. The nodes then switch back to the control channel after the reserved block 116 is consumed.

Exemplary Handshake

Figure 5:
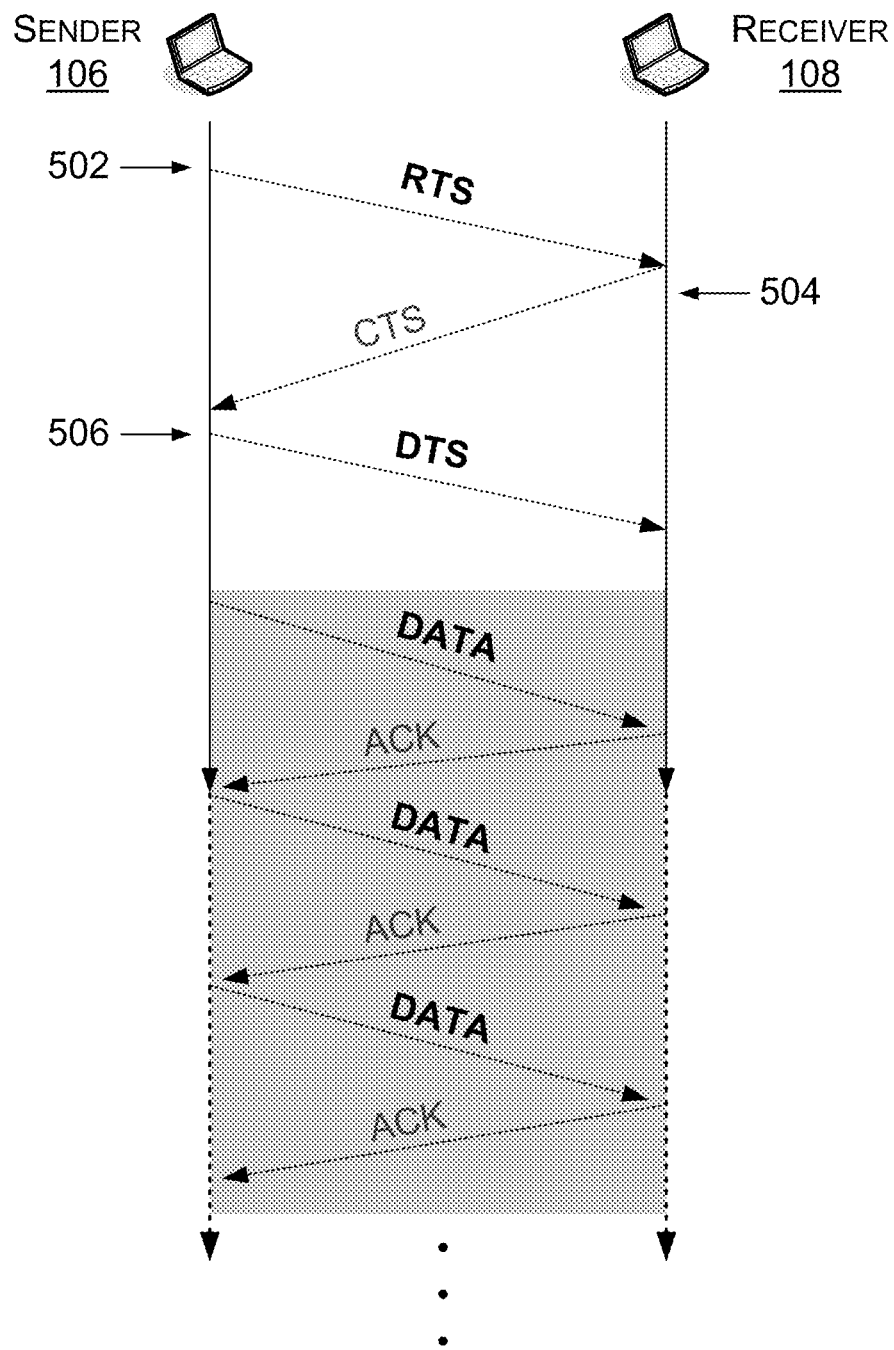
FIG. 5 is a diagram of an exemplary handshake protocol for negotiating time-spectrum blocks.
Figure 6:
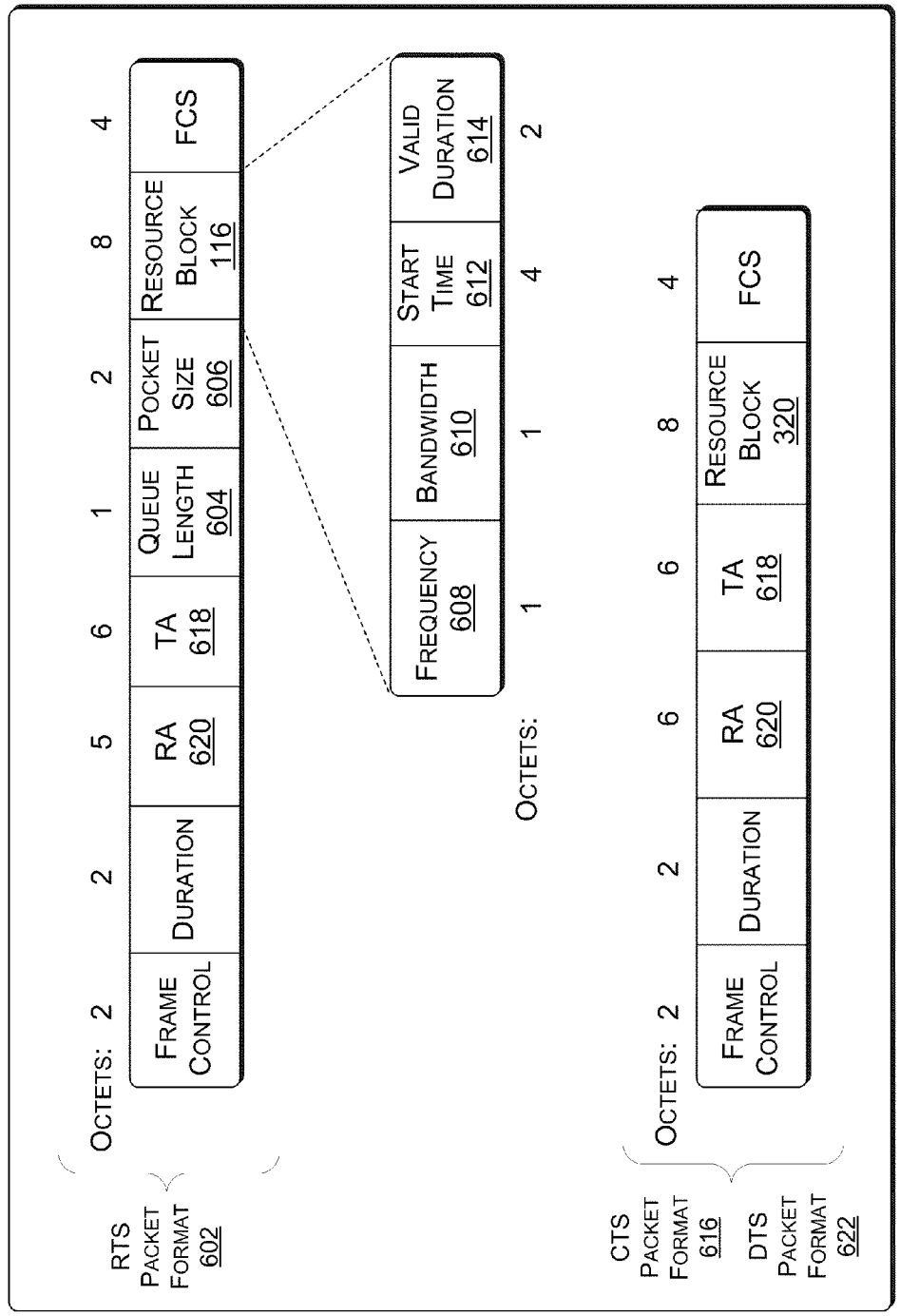
FIG. 6 is a diagram of exemplary communication packet structure enabling dynamic time-spectrum block allocation.

As shown in FIG. 5, in one implementation, the CMAC protocol 202 uses a three-way handshake, which builds on and extends IEEE 802.11's two-way RTS (request-to-send) and CTS (clear-to-send) handshake. Before the handshake process, as mentioned above, the senders contend for spectrum access on the control channel 118, e.g., using the random backoff mechanism of IEEE 802.11. The winning node 106 sends (502) a modified RTS packet to carry traffic load information and several proposed "resource blocks" to the receiver 108. A time-spectrum block 116 is specified by its frequency interval ($f_0$, $f_0+\Delta f$) and the time interval ($t_0$, $t_0+\Delta t$). The regular control packets and the exemplary extended versions are shown in FIG. 6. The modified RTS packet format 602 incorporates the fields of "queue length" 604 (1 byte) and "average packet size" 606 (2 bytes) to describe the traffic load at the sender 106 to the corresponding receiver 108. The RTS packet format 602 also includes multiple time-spectrum blocks 116, each denoted by four fields: the starting frequency $f_0$ 608 (in one implementation, 1 byte), the bandwidth $\Delta f$ 610 (1 byte), the start time $t_0$ 612 (4 bytes), and the duration $\Delta t$ 614 (2 bytes). The starting frequency field 608 can record the offset value from the start frequency of the TV spectrum, which is 512 MHz in one system. One implementation uses 1 byte to denote frequency 608 and bandwidth 610; this provides a resolution of 1 MHz. The start time 612 and duration 614 fields provide a timing resolution of one microsecond.

On receiving the RTS packet 602, the receiver 108 chooses a time-spectrum block 116 and informs the sender 106 using a modified CTS packet 616. The extended CTS packet 616 contains address fields of the sender 618 and the receiver 620, and details of the selected time-spectrum block 116. An exemplary new control packet, DTS (Data Transmission reServation) follows a similar format 622. The sender 106 uses DTS 622 to announce the spectrum reservation after receiving the CTS packet 616. CTS packets 616 and DTS packets 622 may have the same format. Every node 102 hears CTS packets 616 and DTS packets 622 sent by its neighbors to build the RAMatrix 210, which is a local view of spectrum usage in frequency and time. An entry in the structure of the RAMatrix 210 corresponds to one reservation, denoted by the source 618 and destination addresses 620 and the time-spectrum block 116. The RAMatrix 210 is updated each time the node 108 receives or overhears a new CTS packet 616 or DTS packet 622.

To reduce the time overhead caused by reservation, nodes 102 are allowed to make advanced reservations. Therefore, handshaking may be made in parallel with data transfers. In one implementation, for design simplicity, each node 106 is only allowed to have at most one valid outstanding reservation.

The RTS packet 602 can carry more than one time-spectrum block 116 to convey more spectrum usage information to the receiver. However, the more information RTS 602 carries, the higher will be the overhead on the control channel 118. In one implementation, using 1-2 time-spectrum blocks 116 is optimal.

Exemplary Data Transmission

A sender 106 uses the reserved time-spectrum block 116 to send data to the intended receiver 108. Any existing communication protocol can be used. In one implementation, when a pair of communicating nodes switches to the selected segment of spectrum (time-spectrum block 116), they first perform physical-layer carrier sensing. If the selected spectrum is clear, nodes exchange packets without further back-off and without contention. Since the sender 106 has exclusive access to the time-spectrum block 116, it can choose to transmit multiple packets back-to-back during the defined period.

Note that it is possible that after switching, the sender 106 or the receiver 108 may find the selected band to be busy; this may happen for three reasons:

1. The selected band may suffer from interference from transmissions in adjacent frequency bands.

2. The sender 106 or the receiver 108 may experience deep fading in the selected band, and/or 3. Conflicting reservations may occur due to loss of control packets. If the sender 106 or the receiver 108 senses that the selected part of the spectrum is busy, it gives up the current time-spectrum block 116, and switches back to the control channel 118. If the other node does not sense the medium 110 to be busy, and is unable to send or receive, it will wait for a pre-defined interval before switching back to the control channel 118.

Dynamic Spectrum Allocation Formulation

This part of the description describes an abstraction of dynamic spectrum allocation using exemplary adjustable time-spectrum blocks. The physical layer 212 as just described above has a scanner radio 208 for discovering white spaces, as well as a highly reconfigurable transceiver 206. The radio parameters of the transceiver 206, such as the operating frequency, bandwidth, and power level can be adjusted with very low time overhead (in range of tens of microseconds). The transceiver 206 can only tune to a contiguous segment of spectrum. In one implementation, due to the constraints of hardware limitations, the bandwidth options that the reconfigurable transceiver can be adjusted to are a discrete set of values in range of [$b_{min}$, $b_{max}$], where $b_{min}$ and $b_{max}$ denote the lower and upper bounds of the supported bandwidth, respectively. The largest usable bandwidth is limited, typically below 40 MHz. Moreover, in one implementation an extra receiver is incorporated into the physical layer 212 to tune to a fixed segment of unlicensed spectrum, such as the ISM band from 902~928 MHz. This receiver enables a common control channel to exchange spectrum usage information as described above, and in many implementations this extra receiver is implemented by reusing the scanner radio 208 for this dual function.

Formal Definitions and Notation

Consider a network of n nodes V=$\upsilon_1, \ldots, \upsilon_n$ located in the two-dimensional Euclidean plane. Let $d(\upsilon_i, \upsilon_j)$ denote the Euclidean distance between $\upsilon_i$ and $\upsilon_j$. Let $f_{bot}$ and $f_{top}$ denote the lower and upper end of the accessible target spectrum, e.g., $f_{bot}$=470 MHz and $f_{top}$=698 MHz, i.e., in the TV spectrum. Each node $\upsilon_i \in$ V can access the contiguous frequency band [f, f+$\Delta f$], for all $f_{bot} \leq f \leq f+\Delta f \leq f_{top}$, as long as $b_{min} \leq \Delta f \leq b_{max}$, and $\Delta f$ is one of the available bandwidth options.

For each pair of nodes ($\upsilon_i, \upsilon_j$) $\in$ V within mutual communication range, $D_{ij}$ (t, $\Delta t$) denotes the demand in bits per second that needs to be transmitted from $\upsilon_i$ to $\upsilon_j$ during time interval [t,t+$\Delta t$]. This link-based demand subsumes the traffic of all flows that are routed over this particular link and this definition captures the fact that demands may vary both between different links and also on a single link over time. The definition essentially describes a link-based notion of scheduling. Definitions and results in this description can easily be extended to broadcast scheduling problems, in which demands are determined per node, instead of per link.

A crucial difference between the spectrum access using predefined channels and the dynamic access in cognitive radio networks is that (i) the bandwidth of the spectrum allocated to different links becomes an additional variable, and (ii) the radio parameters can be adjusted in a fine timescale. A time-spectrum block 116 designated by $B_{ij}^k=(t_k, \Delta t_k, f_k, \Delta f_k)$ is assigned to link ($\upsilon_i, \upsilon_j$) if sender $\upsilon_i$ is assigned the contiguous frequency band [$f_k, f_k+\Delta f_k$] of bandwidth $\Delta f_k$ during time interval [$t_k, t_k+\Delta t_k$]. This allows the dynamic spectrum allocation problem to be viewed as dynamic packing of time-spectrum blocks into a three-dimensional resource, consisting of time, frequency, and space as shown in FIG. 4. Suppose node $\upsilon_i \in$ V transmits to receiver $\upsilon_j$ using a time-spectrum block $B_{ij}^k$. The amount of data $\upsilon_j$ receives in [$t_k, t_k+\Delta t_k$] can, to a first approximation, be expressed as in Equation (1):

$$C_{ij}(B_{ij}^k) = \Delta f_k \cdot A(f_k, \Delta f_k) \cdot \Delta t_k \cdot \mathcal{B}(\Delta t_k). \quad (1)$$

The function $A(f_k, \Delta f_k)$ characterizes how well the spectrum band $[f_k, f_k+\Delta f_k]$ can be utilized, which depends on the frequency, the bandwidth, and the spectrum condition, as well as on the hardware. The function $\mathcal{B}(\Delta t_k)$ captures the hardware and protocol-specific overhead when accessing the spectrum (for example the overhead incurred by contentions and sending acknowledgements). The term $C_{ij}(B_{ij}^k)$ is the capacity of the allocated time-spectrum block. Under ideal channel conditions (e.g., if sender and receiver are very close) and disregarding any potential overhead, the "ideal" capacity simplifies to $C_{ij}(B_{ij}^k)=\gamma\Delta f_k\Delta t_k$ for some constant $\gamma$.

The above definition is oversimplified, however, because it allows for an overhead-free slicing of time into infinitely fine-grained blocks. Therefore, a more realistic capacity definition that precludes this possibility assumes spectrum utilization to be linear in the bandwidth, but $\mathcal{B}(\Delta t_k)=(1+\beta/\Delta t_k)$, i.e., as in Equation (2):

$$C_{ij}(B_{ij}^k)=\alpha\Delta f_k(\Delta t_k-\beta) \qquad (2)$$

for a constant $\beta$ that represents the overhead incurred when accessing the spectrum band. This overhead may include the time overhead of switching frequency or the time used for access contention on the medium.

Interference Model

A cognitive radio interference model can be based on the protocol model, in which each sender $v_i$ is associated with a transmission range $R_i^t$ and a (larger) interference range $R_i^{int}$. A message sent over a link $(v_i,v_j)$ is successfully received if there is no simultaneous transmitter $v_z$ such that $v_j$ is in $v_z$'s interference range $R_z^{int}$. That is, two time-spectrum blocks $B_{ij}^k(t_k,\Delta t_k,f_k,\Delta f_k)$ and $B_{gh}^l(t_l,\Delta t_l,f_l,\Delta f_l)$ are mutually non-interfering if one of the following conditions is satisfied:

$$d(v_j,v_g)>R_j^{int} \text{ and } d(v_i,v_h)>R_i^{int};$$

$$\max\{f_k,f_l\}\geq\min\{f_k+\Delta f_k,f_l+\Delta f_l\}; \text{ or}$$

$$\max\{t_k,t_l\}\geq\min\{t_k+\Delta t_k,t_l+\Delta t_l\}.$$

Since a cognitive radio incorporates a scanner 208 to detect primary signals, mitigating interferences among secondary users is a key challenge facing the dynamic spectrum allocation. The exemplary abstraction defines a set of prohibited bands $\mathcal{P}=\{P_1,\ldots,P_L\}$, where every $P_l\in\mathcal{P}$ denotes a spectrum band $P_l=[f_y,f_z]$ that is detected by the scanner 208 and used by an incumbent, primary station. A spectrum allocation schedule S is an assignment of time-spectrum blocks $B_{ij}^k$ to links $v_i,v_j\in E$, such that no two assigned blocks $B_{ij}^k$, $B_{gh}^l\in S$ interfere and no prohibited spectrum is used. Formally, a schedule is S feasible if the following conditions hold.

No two assigned time-spectrum blocks interfere; and $[f_i,f_i+\Delta f_i]\cap[f_y,f_z]=\phi$ for every assigned block $B_{ij}^k$ and every $P_l\in P$ with $P_l=[f_y,f_z]$.

Exemplary Dynamic Spectrum Allocation

A centralized spectrum allocation protocol is described below as an intermediate step toward describing the preferred embodiment: a decentralized, distributed spectrum allocation protocol. The centralized spectrum allocation protocol can provide an alternative embodiment, but it is described first, before description of the preferred embodiment, in order to introduce theoretical underpinnings of the preferred distributed spectrum allocation protocol.

Given dynamic demands $D_{ij}(t_k,\Delta t_k)$, exemplary dynamic spectrum allocation processes compute a feasible spectrum allocation schedule S that assigns non-interfering dynamic time-spectrum blocks to links such that demands are satisfied as much as possible, i.e., the spectrum is efficiently utilized.

Numerous measures based on the above formulation facilitate derivation of specific combinatorial optimization problems. The first such measure that characterizes the performance of the protocols is throughput. The term $C_{ij}(B_{ij}^k)$ denotes the maximum amount of data that can be sent over link $(v_i,v_j)$ in time-spectrum block $(B_{ij}^k)$. Thus, the throughput of link $(v_i,v_j)$ in $[t_k,t_k+\Delta t_k]$ is given by Equation (3):

$$T_{ij}(B_{ij}^k)=\min\{D_{ij}(t_k,\Delta t_k),C_{ij}(B_{ij}^k)\} \qquad (3)$$

and throughput maximization tries to find a feasible schedule S that maximizes, as in Equation (4):

$$T_{max} = \sum_{(v_i,v_j)\in E}\sum_k T_{ij}(B_{ij}^k) \qquad (4)$$

As the throughput measure does not account for a notion of fairness, the exemplary protocol also adopts a measure that maintains proportionally-fair throughput among different demands. For some demand $D_{ij}(t_k,\Delta t_k)$ let $I_{ij}$ denote all time intervals $[t,t+\omega]$ for some fixed $\omega$, for which $[t,t+\omega]\in[t_k,t_k+\Delta t_k]$. Then, the minimum proportionally fair throughput $T_{min\,fair}(\omega)$ for a link with demand $D_{ij}(t_k,\Delta t_k)>0$ is given in Equation (5):

$$T_{min\,fair}(\omega) = \min_{(v_i,v_j)\in E}\min_{[t,t+\omega]\in I_{ij}}\frac{T_{ij}(t,t+\omega)}{\omega\cdot D_{ij}(t_k,\Delta t_k)}, \qquad (5)$$

where $T_{ij}(t,t+\omega)$ is the throughput achieved during interval $[t,t+\omega]$. A high minimum proportionally-fair throughput therefore guarantees that in every time-interval of length $\omega$, every demand gets its fair share of throughput. The shorter that $\omega$ is chosen, the more short-term and fine-grained this notion of fairness becomes. In particular, a protocol that guarantees good minimum proportionally-fair throughput for very small values of $\omega$ (say, in the order of a few milliseconds) leads to low latencies and minimizes jitter.

Exemplary Centralized Spectrum Allocation

An exemplary centralized spectrum allocation process is described first, with short-term proportionally-fair throughput performance that is satisfactory even in worst-case networks.

The exemplary centralized protocol assumes that each node has only one outgoing demand and that $|\mathcal{P}|=0$. Without loss of generality, it is also assumed that $f_{bot}=0$. For notation, let $\Delta_{min}$ be the minimum duration of any demand and let $\chi=\Delta_{min}/\beta$. In practical scenarios, $\chi$ is a very large constant. Let $D_{ij}(t)$ denote the current demand of link $(v_i,v_j)$ at time t, and let $S_{ij}(t)$ be the sum of demands of all links in $E_{ij}$ at time t. For a link $(v_i,v_j)$, the term $E_{ij}$ denotes the set of links that cannot be scheduled together with $(v_i,v_j)$ at the same time using the same frequency band. A solution that assigns blocks of bandwidth $D_{ij}(t)(f_{top}-f_{bot})/S_{ij}(t)$ to each node is proportionally-fair at time t.

Exemplary Centralized Spectrum Allocation Pseudo-Code

The exemplary centralized spectrum allocation process can be implemented, for example, as the following pseudo-code:

1: Define the constants $\Gamma=\chi\beta/k$ for some $3\leq k\chi$.
2: Schedule at time $t_{cur}$:
3: Let $A_{cur}=\{D_{ij}(t,\Delta t)|t\Delta t\geq t_{cur}+\Gamma\}$ be the set of active demands -continued 4: Let $D'_{ij}=\min\{2^i, i\in Z | 2^i \geq D_{ij}(t,\Delta t)\}$ for each demand in $A_{cur}$.
5:    for each $D_{ij}(t,\Delta t)\in A_{cur}$ in non increasing order of $D'_{ij}$:
6:      Assign the non-interfering frequency interval $I_{ij}=[l_{ij},l_{ij}+D'_{ij}]$ with minimal $l_{ij}$ to $(\upsilon_i,\upsilon_j)$.
7:    end for
8: Let $\Phi_{max}$ be the highest upper boundary $l_{ij}+D'_{ij}$ of any interval $I_{ij}$ assigned to any active demand in $A_{cur}$.
9: Set $\phi=(f_{top}-f_{bot})/\Phi_{max}$ and assign to each link $(\upsilon_i,\upsilon_j)$ with active demand the time-spectrum block $B_{ij}^{cur}=(t_{cur},\Gamma,\phi l_{ij},\phi D'_{ij})$
10. $t_{cur}=t_{cur}+\Gamma$ Periodically, (in one implementation, after a time-interval of size $\Gamma=\chi\beta/k$), the exemplary centralized spectrum allocation process attempts to readjust the current spectrum assignment and assigns new time-spectrum blocks 116 to each active link. The exemplary protocol aims to adjust quickly enough to be responsive to variation in demand, but on the other hand, too frequent reallocation of time-spectrum blocks is inefficient due to the overhead time β. The above definition for the size Γ of a time-interval ensures a good balance between these two contradictory aims.

Within a single time-interval, the exemplary centralized allocation process tries to maximize proportionally-fair spectrum usage by greedily assigning frequency intervals to nodes with active demands. In one implementation, a demand is called active if its duration spans the entire time-interval $[t_{cur}, t_{cur}+\Gamma]$. Particularly, in one implementation, demands are rounded to the next higher power of 2. In non-increasing order of this demand-size, frequency-intervals $I_{ij}$ are then allocated to links with active demands in a simple greedy fashion. The underlying reason for rounding demands thusly, as in Line 4 of the above pseudo-code, is that in combination with the greedy allocation of bandwidths, this avoids fragmentation of the spectrum even in multi-hop scenarios. This guaranteed absence of unwanted fragmentation in the greedy-allocation phase is a key design principle of the exemplary centralized allocation process.

If the initial spectrum allocation leads to an infeasible result, then all assigned frequency intervals can be linearly scaled down by a factor of $\phi=(f_{top}-f_{bot})/\Phi_{max}$, where $\Phi_{max}$ is a scaling factor that ensures feasibility. The exemplary centralized spectrum allocation process provides spectrum allocation within a constant ratio of the optimal solution with regard to $T_{min\,fair}(\Delta)$ for any value between $3\beta \leq \Delta \leq \chi\beta$.

Distributed Spectrum Allocation

The exemplary distributed spectrum allocation process to be described below determines a utilization of the communication spectrum at each of multiple nodes without requiring centralized allocation control. Each node in a locality then aggregates the utilizations from at least some of the nodes of the network into a local, yet consistent view of the spectrum utilization. Then each node reserves a part of the spectrum based on its local view.

Efficient Distributed Spectrum Allocation Features

Before describing the exemplary distributed spectrum allocation process, it is helpful to review some of the desirable features that any efficient spectrum allocation scheme should have.

First, regarding opportunistic usage, the exemplary distributed spectrum allocation process divides the overall bandwidth B of white spaces to accommodate the contending links by tuning the operating bandwidth. In particular, the spectrum is adaptively bundled together to deliver high throughput for heavy traffic from few users, or be opportunistically fragmented and shared among a large number of contending devices.

Regarding fine-timescale control, links should ideally share the spectrum in fine timescale in order to adapt to instantaneous traffic demand and control latency. The size of the time increments in such a fine timescale, is defined to achieve a balance between the agility of solutions and the time overhead associated with each allocation.

Regarding non-interfering allocation, all allocated time-spectrum blocks are mutually non-interfering. The exclusive access to a time-spectrum block 116 largely reduces the time overhead of contentions in the given band, mitigates the hidden terminal problem after frequency switching, and encourages packet aggregation for high efficiency.

Exemplary Distributed Allocation Protocol

The following description describes the exemplary b-SMART distributed spectrum allocation process introduced above. In order to realize dynamic fine-timescale allocation, all nodes 102 running b-SMART maintain the instantaneous spectrum usages of their neighbors 104, 106, 108. The sender and the intended receiver coordinate with each other and reserve a time-spectrum block 116 that is available at both nodes. The size of the block 116 is determined using the exemplary b-SMART protocol, which is executed at the sender and the receiver. The exemplary CMAC protocol supports the reservation of a time-spectrum block 116 and the b-SMART spectrum allocation process is implemented as a spectrum allocation engine 204 or a method that is run locally at each node.

Dynamic Spectrum Allocation

The exemplary CMAC protocol described above only regulates which sender-receiver pair (102, 104) may reserve some time-spectrum block 116 at a specific time. At the heart of the exemplary CMAC protocol is protocol for the dynamic spectrum allocation engine 204 or corresponding method that decides on the four variables t, Δt, f, and Δf to shape each time-spectrum block 116. The exemplary spectrum allocation method is invoked when a sender 102 sends an RTS packet to an eligible receiver 104. The sender 102 considers the available white spaces, the local spectrum allocation table 210, and the corresponding queue size qLen, to decide on a time-spectrum block 116.

This dynamic decision is guided by the following principles. First, the bandwidth Δf is determined based on the current demand; the bandwidth should be large enough to achieve a high data-rate, but not too large considering the desire to avoid fragmentation in the white spaces and the expectation of fairness among multiple nodes. Hence, b-SMART attempts to assign to each sender-receiver pair $(\upsilon_i,\upsilon_j)$ a time-spectrum block 116 with bandwidth B/N, where N is a measure for how much congestion exists in the neighborhood of the sender and receiver. In one implementation, N is defined as the number of current disjoint transmissions in the interference range of $(\upsilon_i,\upsilon_j)$. Two transmissions are considered disjoint if they do not share either endpoint along a temporal axis. This definition of N aims at achieving per-node fairness and is particularly appealing because the definition can easily be implemented in a distributed setting.

A second design trade-off is the block duration Δt. While using a shorter time-spectrum block 116 reduces delay and improves connectivity, the shorter blocks 116 result in higher contention on the control channel. In one implementation, an upper bound is set on $T_{max}$, i.e., the maximum block-duration, and nodes always try to send packets for the entire duration $T_{max}$. The choice for $T_{max}$ should amortize the incurred overhead in the control channel, thereby preventing the control channel from becoming a bottleneck.

The exemplary distributed allocation method evaluates available bandwidth options in decreasing order, starting with a bandwidth option just exceeding B/N. The exemplary distributed spectrum allocation process can be implemented, for example, as the following pseudo-code:

```
1:  Let the available bandwidth options be: {b₁,b₂,...,bₙ} with
    b₁<b₂,<...,bₙ;
2:  I:=min{i\b_i ≧ B/N};
3:  for I=I, ..., 1 do
4:     Δf=b_i;Δt:=min{T_max,Tx_Duration(b_i,qLen)}
5:     If Δt==T_max or i==1 then
6:        Find the best placement of the Δf×Δt block in the local spectrum
    allocation table that minimizes the finishing time and is compatible with
    the existing allocations and prohibited bands;
7:     if the block can be placed in the local spectrum allocation table then
8:        return the allocation (t,Δt,f,Δf);
9:     end if
10: end if
11: end for
```

For each bandwidth option $\Delta f = b_i$ in consideration, the exemplary distributed allocation process estimates corresponding transmission time $\Delta t$ based on the current queue size (i.e., how long it uses the specific bandwidth to empty the queue). If the resulting transmission time exceeds $T_{max}$, then $\Delta t$ is set to $T_{max}$. Given $\Delta t$ and $\Delta f$, the placement of the time-spectrum block 116 in the local allocation table 210 is then optimized. This optimization is accomplished by minimizing the finishing time while not overlapping with existing allocations and parts of the spectrum used by incumbent users. If a time-spectrum block 116 of size $\Delta t \times \Delta f$ cannot be placed, then the next smaller bandwidth option is considered.

Choice for the values of the two important parameters, $T_{max}$ and N influences the efficiency and accuracy of b-SMART. For predetermining $T_{max}$, let $\Lambda = B/b_{min}$ denote the maximum number of parallel transmissions that the white spaces of bandwidth B can accommodate, where $b_{min}$ is the smallest bandwidth option. In one implementation, $T_{max}$ satisfies the following condition given in Equation (6):

$$T_{max} \geq \Lambda \cdot T_o = B \cdot T_o / b_{min}, \quad (6)$$

where $T_o$ denotes the average time spent on one successful handshake in the control channel. This formula keeps the white spaces fully utilized by preventing the control channel from becoming the bottleneck. To do this, it is important to ensure that the rate at which handshakes are generated, $R_f$, is not less than the rate at which nodes return to the control channel, $R_r$. The handshake is generated at the rate of $1/T_o$, thus $R_f = 1/T_o$. Since the maximal number of parallel transmissions in the spectrum is $\Lambda$ and each regular transmission lasts for $T_{max}$, the maximal returning rate is $\Lambda/T_{max}$. The definition of $T_{max}$ now follows from the fact that in a fully utilized spectrum, $\Lambda/T_{max}$ should exceed $1/T_o$. The empirical formula indicates that by increasing $T_{max}$ or reducing the handshake overhead, more parallel transmissions can be supported by the control channel.

In one implementation of the exemplary distributed allocation process chooses the bandwidth $\Delta f$ for a link L based on N, the instantaneous number of disjoint transmissions in the interference range of link L. In the distributed scenario, however, it is difficult to determine a perfect estimation of N considering such a process is repeated in a fine timescale. But N can be approximated using the number of valid time-spectrum blocks 116 stored in the local table 210. At time $t_{cur}$, a block is valid if $t + \Delta t > t_{cur}$.

Figure 7:
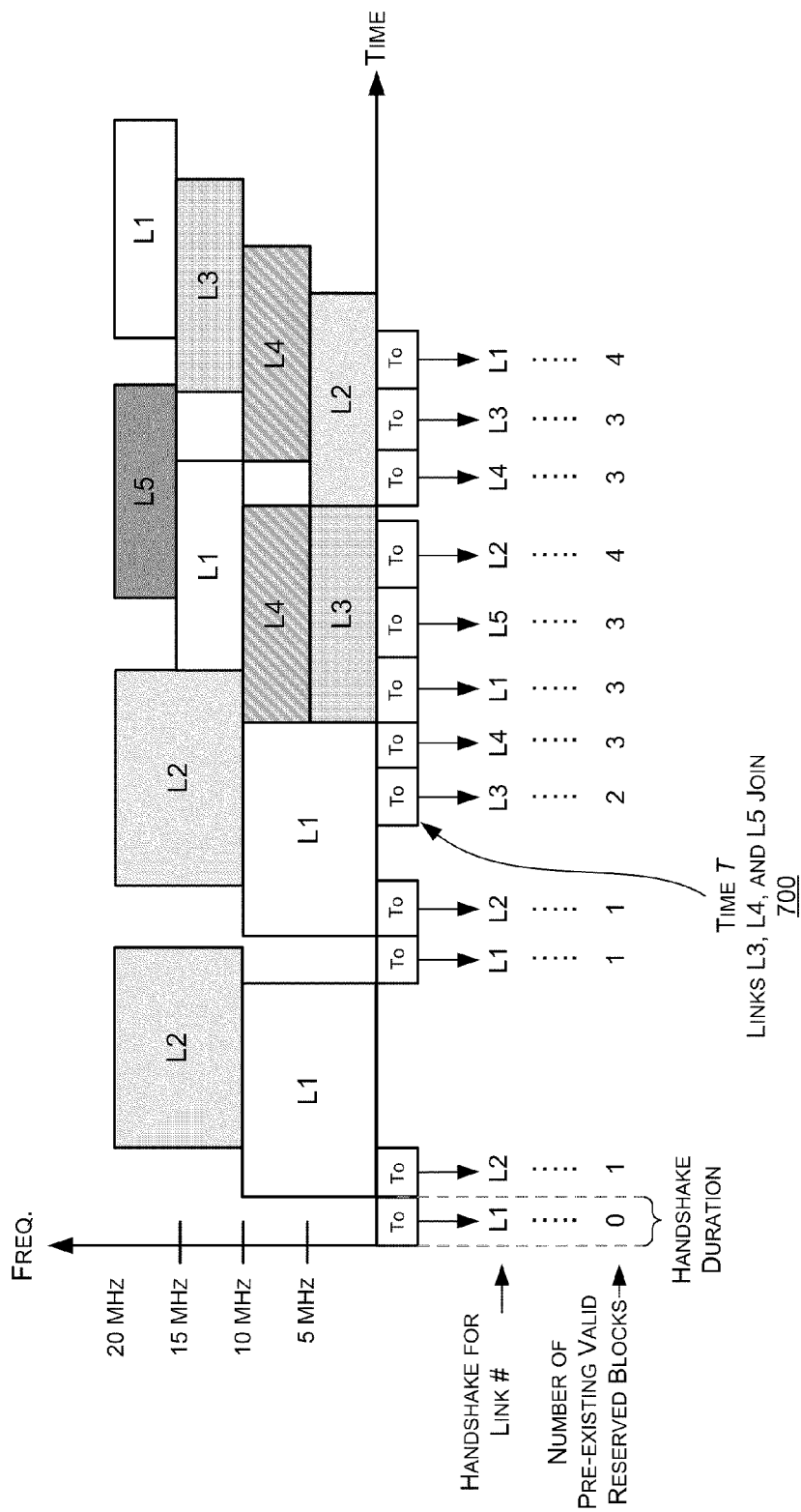
FIG. 7 is a diagram of exemplary dynamic time-spectrum block allocation.

FIG. 7 depicts an example of spectrum allocation of 20 MHz white spaces and an online approximation of N. At time T 700, links L3, L4, and L5 join links L1 and L2. All the links are disjoint, backlogged, and within each other's transmission range. Initially, L1 and L2 each get a half of the spectrum, because the number of pending blocks is 1, hence N=2 and Δf for each link is 10 MHz. As three more links join the network, the number of valid blocks 116 increases. Accordingly, the protocol forces each link to reduce its bandwidth share Δf to 5 MHz in order to increase parallelism. In the initial stage when many new links join the network, it takes a time period to collect relevant reservations and learn the existence of the local contending transmissions. But this learning period is short for various traffic types and even for a large number of new nodes.

It is worth noting that since N is derived based on the up-to-date reservations, b-SMART is responsive to user and traffic dynamics. The number of disjoint transmissions is effectively tracked, especially when flows are long-lived and backlogged with packets. In the unsaturated case, it becomes evident that the exemplary distributed allocation process is conservative since B/N constrains the upper limit of the bandwidth. Hence, in such cases, using more complex greedy strategies can potentially achieve better performance. In fact, many different strategies for enhancing the decisions during construction of the time-spectrum blocks 116 can be employed.

With respect to receiver scheduling, to meet the $T_{max}$ duration requirement, the exemplary distribution allocation process incorporates a packet aggregation procedure and can implement a round-robin scheduler to handle the packet queues in a node. A node periodically examines the output packet queues of its neighbors. A neighbor becomes eligible if (i) it does not have an outstanding reservation; and (ii) the output packet queue for this neighbor has accumulated enough packets to satisfy the $T_{max}$ requirement, or the queue has timed out for packet aggregation.

Exemplary Methods

Figure 8:
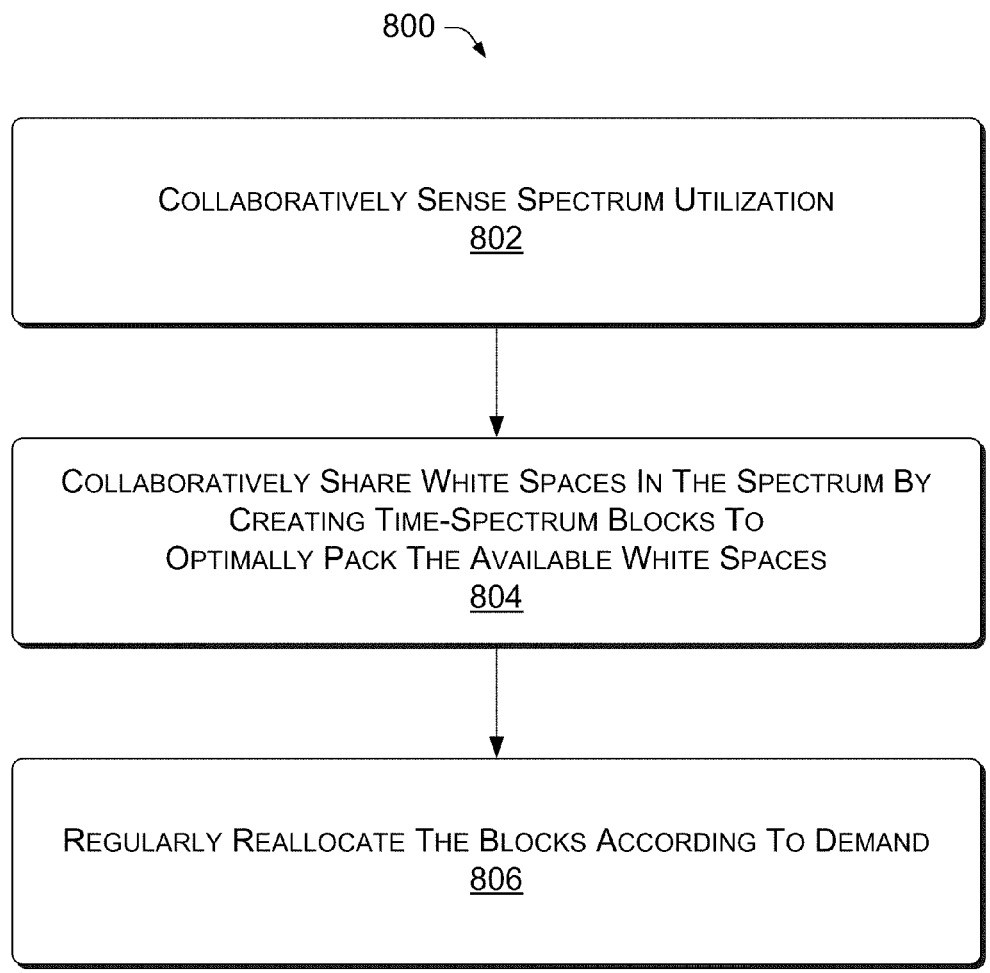
FIG. 8 is a flow diagram of an exemplary method of dynamically allocating time-spectrum blocks.

FIG. 8 shows an exemplary method 800 of dynamic time-spectrum block allocation. In the flow diagram, the operations are summarized in individual blocks. The exemplary method 800 may be performed by combinations of hardware, software, firmware, etc., for example, by components of the exemplary cognitive wireless networking engine 114.

At block 802, peer wireless nodes collaboratively sense spectrum utilization in their neighborhood. Each node contends for and negotiates its own blocks of white space spectrum, and listens for block reservations made by its neighboring nodes. Each node keeps a combined view of the spectrum utilization in a local allocation table.

At block 804, the wireless nodes collaboratively share the white spaces in the communication spectrum for information transfer between sender-receiver pairs of the peer nodes. The collaboratively sharing is accomplished by creating time-spectrum blocks that efficiently pack the available white space bandwidth in such a manner as to optimize utilization of the white spaces and provide many other benefits. Blocks of the white space are negotiated for each link between two nodes. Each block is defined by negotiating an available frequency in the communication spectrum, a bandwidth in relation to the frequency, a starting time, and a duration during which to exchange the information using the frequency and the bandwidth.

At block 806, the blocks are regularly reallocated according to demand, by modifying the bandwidth assigned to each block, for example, such that the reallocation maintains a fair distribution of the overall bandwidth of the white spaces among the communication links, maximizes utilization of the white spaces, minimizes a finishing time for communications between nodes, reduces contention overhead among the nodes contending for the white spaces, and creates blocks of communication spectrum usage that do not overlap with respect to each other and with respect to existing allocations of the communication spectrum.

Figure 9:
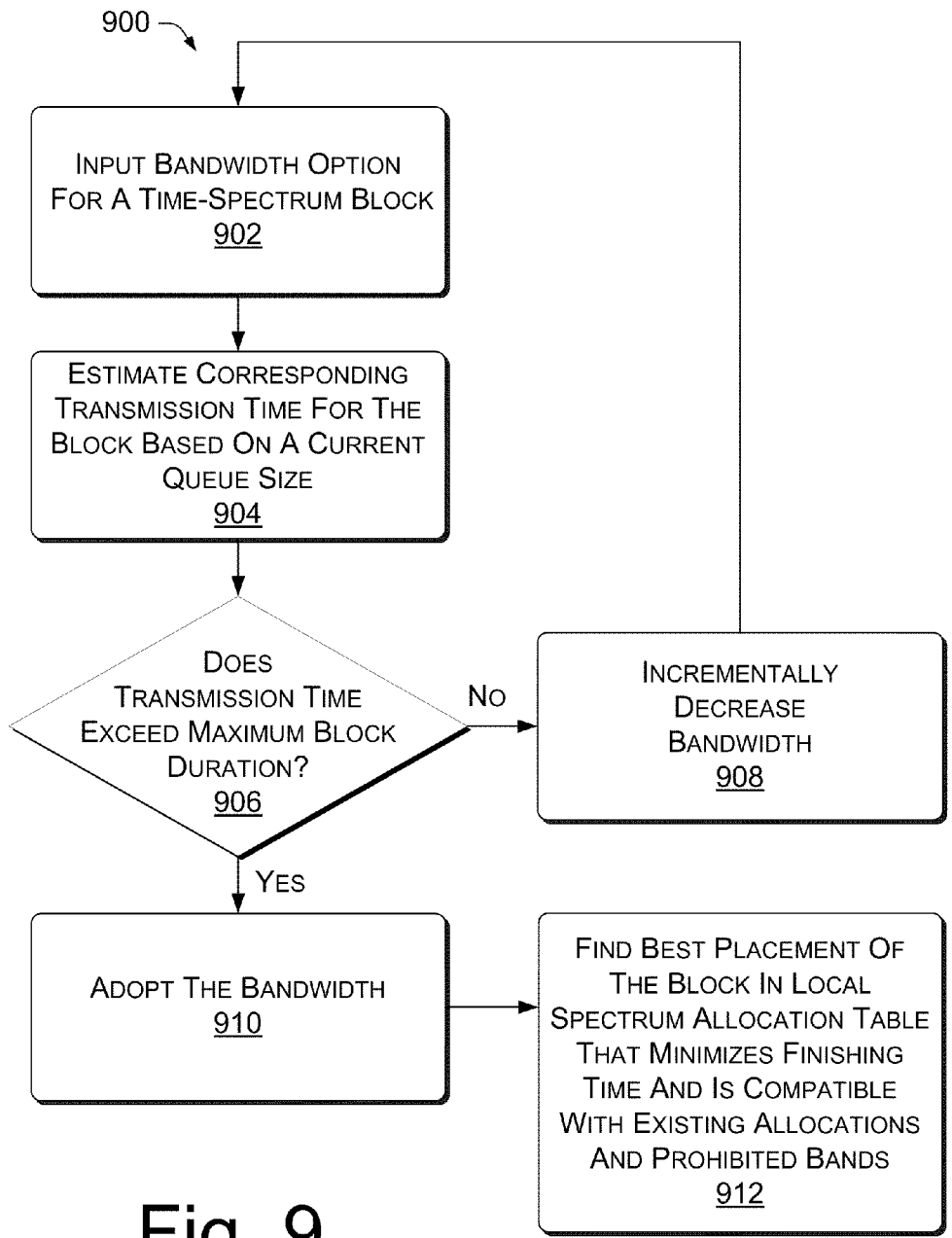
FIG. 9 is a flow diagram of an exemplary method component for dynamically allocating time-spectrum blocks in a distributed implementation.

FIG. 9 shows an exemplary method 900 for distributed dynamic time-spectrum block allocation. In the flow diagram, the operations are summarized in individual blocks. The exemplary method 900 may be performed by combinations of hardware, software, firmware, etc., for example, by components of the exemplary cognitive wireless networking engine 114.

At block 902, a bandwidth option is input in order to be evaluated for constructing a time-spectrum block. In one implementation, the method 900 begins by considering a bandwidth that exceeds the value of the overall available white space bandwidth divided by the number of current disjoint transmissions.

At block 904, a corresponding transmission time for the block is estimated. That is, at the bandwidth being considered, the method 900 calculates the transmission time to empty the local queue of information to be transferred.

At block 906, the estimated transmission time is compared to a predetermined maximum block duration. By trying to create blocks that come as close as possible to the maximum block duration, the method 900 provides several efficiencies, including reducing overhead that occurs when the nodes contend for the white spaces. If the estimated transmission time does not exceed the maximum block duration, then the method 900 branches to block 908, but if the estimate transmission time equals or exceeds the maximum block duration then the method 900 branches to block 910.

At block 908, the current bandwidth option being considered is incrementally decreased and the method 900 loops back to beginning block 902 to consider the next bandwidth option.

At block 910, when the criterion at block 906 is met: the bandwidth being considered results in an estimated transmission time with respect to information waiting to be transferred in the local queue that meets or exceeds the predetermined maximum block duration, so the bandwidth is adopted as the bandwidth to be allocated to a time-spectrum block.

At block 912, the method finds the best placement of the block in the local spectrum allocation table that minimizes finishing time and is compatible with existing allocations and prohibited bands.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
    sensing communication spectrum utilization among peer nodes capable of using the communication spectrum;
    sharing white spaces in the communication spectrum for information transfer between sender-receiver pairs of the peer nodes,
    wherein sharing the white spaces includes optimizing utilization of the white spaces, including for each sender-receiver pair of the nodes, negotiating blocks of the white spaces for the information transfer, each block defined by negotiating an available frequency in the communication spectrum, a bandwidth in relation to the frequency, a starting time, and a duration to exchange the information using the frequency and the bandwidth;
    evaluating bandwidth options for each block in decreasing order of bandwidth, starting at a bandwidth greater than B/N, where B comprises the overall bandwidth of the white spaces and N comprises a measure of congestion in a neighborhood of the sender and the receiver; and
    reallocating the blocks at intervals according to changes in the spectrum utilization.

2. The method as recited in claim 1, wherein the peer nodes collaboratively sense the communication spectrum utilization, collaboratively optimize utilization of the white spaces, and collaboratively reallocate the blocks at intervals according to the spectrum utilization, without participation of a centralized node.

3. The method as recited in claim 1, further comprising reallocating the blocks to minimize a finishing time for communications between nodes.

4. The method as recited in claim 1, further comprising reallocating the blocks to reduce contention overhead among the nodes for the white spaces.

5. The method as recited in claim 1, further comprising reallocating the blocks to create other blocks of communication spectrum usage that do not overlap within an interference range with respect to each other and with respect to existing allocations of the communication spectrum.

6. The method as recited in claim 1, further comprising optimizing placement of a representation of the blocks in a local spectrum allocation table of each node.

7. The method as recited in claim 6, wherein a sending node negotiates the block by evaluating the overall bandwidth B of the white spaces, the local spectrum allocation table, and a queue size of information to be transferred.

8. The method as recited in claim 1, wherein the negotiating includes sending a request-to-send (RTS) packet, wherein the RTS packet structure contains a view of the spectrum utilization at a node sending the RTS packet.

9. The method as recited in claim 1, wherein the congestion measure N is approximated from a number of blocks stored in a local allocation table of one of the nodes.

10. The method as recited in claim 1, further comprising:
    for each bandwidth being evaluated, estimating a corresponding duration of the block for transmitting the information based on a current queue size of the information to be transferred; and
    when the estimated duration exceeds a selected maximum block duration, then setting the duration of the block to the value of the maximum block duration.

11. The method as recited in claim 1, wherein when additional pairs of the nodes negotiate for blocks of the white spaces, then all pairs negotiating for blocks reduce their share of the bandwidth to increase parallelism.

12. The method as recited in claim 1, wherein negotiating the duration of the block is based on a balance between shortening each block to reduce delay and improve connectivity versus lengthening each block to manage an amount of contention for the white spaces;
    wherein a maximum block duration is selected to amortize overhead associated with the contention for the white spaces;
    wherein a sending node queues the information in order to transfer the information for the entire maximum block duration.

13. The method as recited in claim 12, wherein the maximum block duration is selected to ensure that a rate at which handshakes between nodes for negotiating the white spaces is greater than or equal to a rate at which the nodes return to a control channel for contending for the white spaces.

14. The method as recited in claim 12, further comprising aggregating packets of the information in order to transfer the information for the entire maximum block duration.

15. A system, comprising:
wireless nodes, each capable of self-tuning a variable frequency parameter and an associated variable bandwidth parameter for transferring information via a communication spectrum;
a network engine in each wireless node configured to sense communication spectrum utilization among peer nodes and to share white spaces in the communication spectrum for transferring information;
a local allocation table in each wireless node to store a view of local spectrum allocation with respect to time; and
a spectrum allocation engine in each wireless node configured to negotiate time-frequency blocks of the communication spectrum for the information transfer, each block defined by an available frequency in the communication spectrum, a bandwidth in relation to the frequency, a starting time, and a duration to exchange the information using the frequency and the bandwidth, the spectrum allocation engine configured to select a maximum block duration to amortize overhead associated with contention among the wireless nodes for the white spaces.

16. The system as recited in claim 15, wherein the spectrum allocation engine negotiates the block by evaluating an overall bandwidth of the white spaces, the local spectrum allocation table, and a queue size with respect to the information to be transferred.

17. The system as recited in claim 15, wherein the spectrum allocation engine adapts the frequency, bandwidth, start time, and duration of a block at regular intervals according to the overall bandwidth of white spaces in the communication spectrum and a congestion in a neighborhood of a sender and a receiver.

18. The system as recited in claim 15, wherein the spectrum allocation engine evaluates bandwidth options for each block in decreasing order of bandwidth, starting at a bandwidth greater than B/N;
for each bandwidth being evaluated, estimates a corresponding duration of the block for transmitting the information based on a current queue size of the information to be transferred; and
when the estimated duration exceeds a selected maximum block duration, sets the duration of the block to the value of the maximum block duration.

19. The system as recited in claim 15, wherein a sending node queues the information in order to transfer the information for the entire maximum block duration.

20. A method, comprising:
sensing communication spectrum utilization among peer nodes capable of using the communication spectrum;
sharing white spaces in the communication spectrum for information transfer between sender-receiver pairs of the peer nodes, the sharing including:
optimizing utilization of the white spaces, including for each sender-receiver pair of the nodes, and
negotiating blocks of the white spaces for the information transfer, each block being defined by negotiating an available frequency in the communication spectrum, a bandwidth in relation to the frequency, a starting time, and a duration to exchange the information using the frequency and the bandwidth, wherein negotiating the duration is based on a balance between shortening each block to reduce delay and to improve connectivity versus lengthening each block to manage an amount of contention for the white spaces; and
reallocating the blocks at intervals according to changes in the spectrum utilization.

* * * * *